(12) United States Patent
van Dijk et al.

(10) Patent No.: US 12,455,314 B2
(45) Date of Patent: Oct. 28, 2025

(54) CAN TRANSCEIVER AND METHOD FOR THE CAN TRANSCEIVER

(71) Applicant: NXP B.V., Eindhoven (NL)

(72) Inventors: Lucas Pieter Lodewijk van Dijk, Kranenburg (DE); Gerald Kwakernaat, Malden (NL)

(73) Assignee: NXP B.V., Eindhoven (NL)

( * ) Notice: Subject to any disclaimer, the term of this patent is extended or adjusted under 35 U.S.C. 154(b) by 95 days.

(21) Appl. No.: 18/485,919

(22) Filed: Oct. 12, 2023

(65) Prior Publication Data

US 2024/0168090 A1 May 23, 2024

(30) Foreign Application Priority Data

Nov. 22, 2022 (EP) .................................. 22208925

(51) Int. Cl.
 *G01R 31/317* (2006.01)
 *G01R 31/30* (2006.01)
(52) U.S. Cl.
 CPC ... *G01R 31/31715* (2013.01); *G01R 31/3004* (2013.01); *G01R 31/31713* (2013.01)
(58) Field of Classification Search
 None
 See application file for complete search history.

(56) References Cited

U.S. PATENT DOCUMENTS

| | | | | |
|---|---|---|---|---|
| 9,330,045 B2 * | 5/2016 | Muth | ........................ | G06F 3/00 |
| 9,471,528 B2 * | 10/2016 | Muth | .................. | G06F 13/4072 |
| 12,261,716 B2 * | 3/2025 | Walrant | .................. | H04L 43/10 |
| 2004/0153870 A1 * | 8/2004 | Konz | ................ | H04L 12/40169 |
| | | | | 710/100 |
| 2009/0119053 A1 | 5/2009 | Tseng | | |
| 2012/0155285 A1 * | 6/2012 | Smart | ..................... | H04L 43/50 |
| | | | | 370/242 |
| 2016/0149612 A1 * | 5/2016 | Julson | .................. | H04L 12/403 |
| | | | | 375/224 |
| 2016/0161544 A1 | 6/2016 | Freitas et al. | | |

(Continued)

FOREIGN PATENT DOCUMENTS

| | | | | |
|---|---|---|---|---|
| CN | 118523786 A | * | 8/2024 | ............... H04B 1/40 |
| EP | 3461068 A1 | | 3/2019 | |
| EP | 4236214 | | 8/2023 | |

OTHER PUBLICATIONS

English translation of CN 118523786 A (Year: 2024).*

(Continued)

*Primary Examiner* — Jermele M Hollington

(57) ABSTRACT

The present disclosure relates to a controller area network, CAN, transceiver, comprising: a transmit data, TXD, interface, a receive data, RXD, interface, a CAN Bus interface, a transmitter, a receiver, a reducer, and a test unit, wherein the transmitter is coupled between the TXD interface and a test unit input of the test unit, a first test unit output of the test unit is coupled to the CAN Bus interface, the CAN Bus interface is coupled to a receiver input of the receiver via the reducer, a second test unit output of the test unit is coupled to the receiver input of the receiver, the test unit is configured, in a first state, to couple the test unit input to the first test unit output and is configured, in a second state, to couple the test unit input to the second test unit output.

20 Claims, 6 Drawing Sheets

(56) References Cited

U.S. PATENT DOCUMENTS

| | | | |
|---|---|---|---|
| 2018/0137071 A1* | 5/2018 | Sturm | G06F 13/374 |
| 2019/0095379 A1* | 3/2019 | Schmitz | H04L 12/403 |
| 2023/0353417 A1* | 11/2023 | van Dijk | H04L 12/40006 |
| 2024/0178875 A1* | 5/2024 | van Dijk | H04B 1/40 |

OTHER PUBLICATIONS

Texas Instruments; "SN65HVD233, SN65HVD234, SN65HVD235 Can Bus Transceivers"; Data Sheet Version 3.3; 39 pages (Nov. 2002—revised Nov. 2018).

* cited by examiner

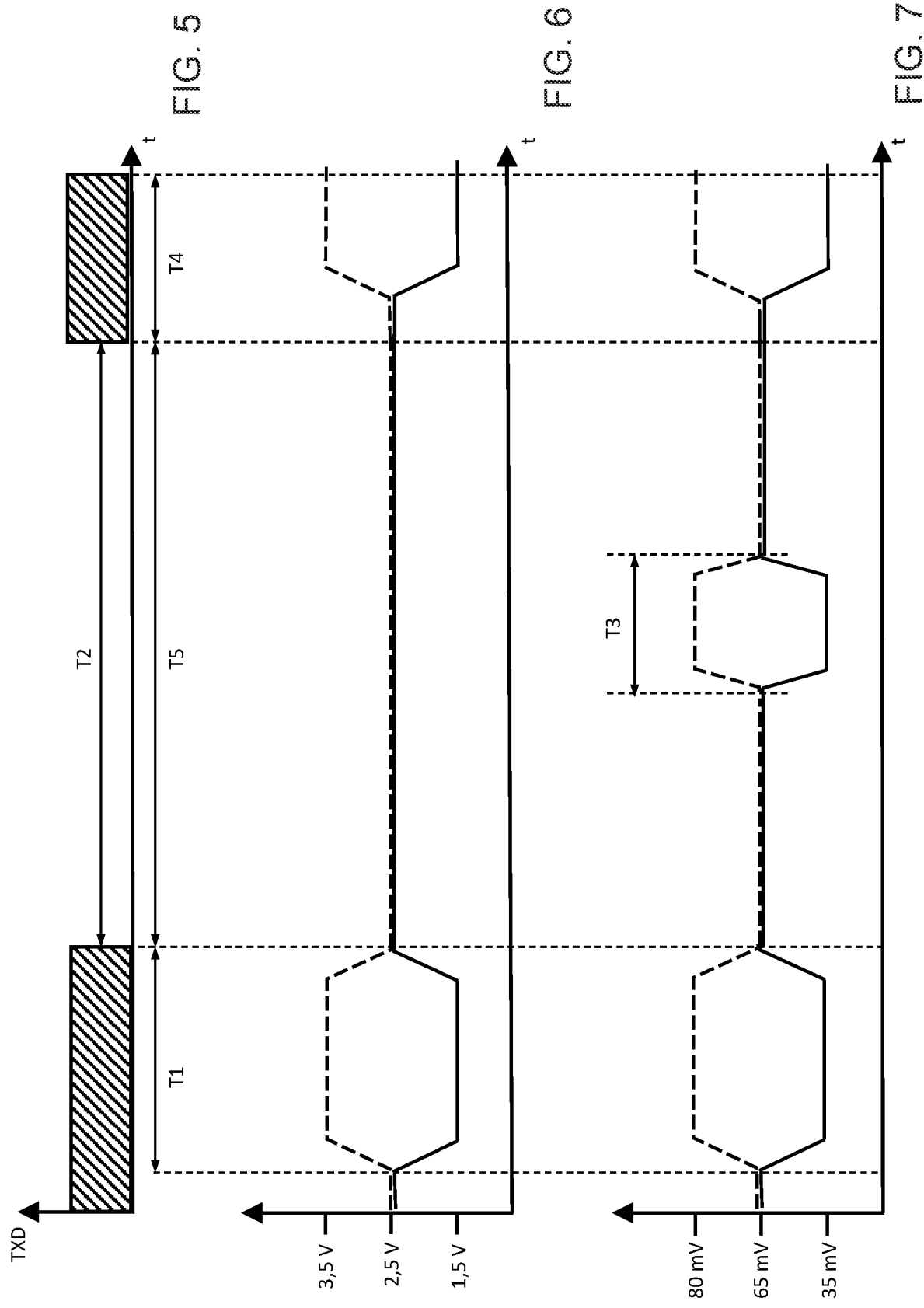

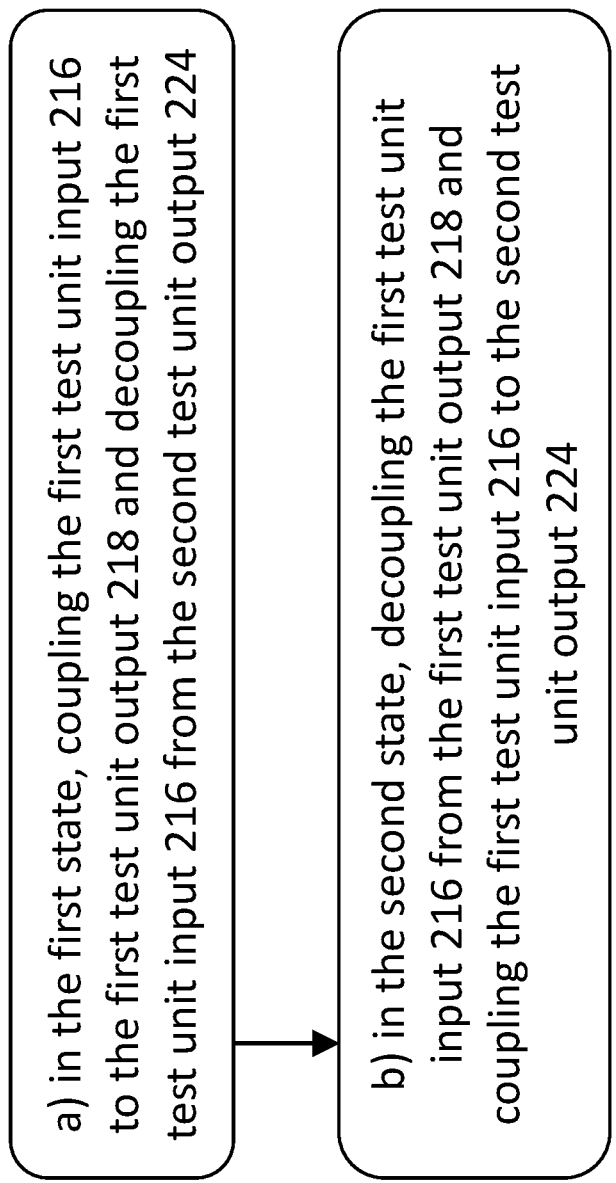

CAN TRANSCEIVER AND METHOD FOR THE CAN TRANSCEIVER

CROSS-REFERENCE TO RELATED APPLICATIONS

This application claims priority under 35 U.S.C. § 119 to European patent application no. 22208925.2, filed Nov. 22, 2022, the contents of which are incorporated by reference herein.

TECHNICAL FIELD

The present disclosure relates to a Controller Area Network, CAN, Transceiver and a method for the CAN transceiver.

BACKGROUND

CAN buses can be used for communications within vehicles, in particular within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a controller area network, CAN, transceiver is provided, The CAN transceiver comprising: a transmit data, TXD, interface, a receive data, RXD, interface, a CAN Bus interface, a transmitter, a reducer, and a test unit, wherein a transmitter input of the transmitter is coupled to the TXD interface for receiving a TXD signal, wherein a transmitter output of the transmitter is coupled to a test unit input of the test unit and a first test unit output of the test unit is coupled to the CAN Bus interface, wherein the CAN Bus interface is coupled to a receiver input of the receiver via the reducer, wherein a receiver output of the receiver is coupled to the RXD interface, wherein a second test unit output of the test unit is coupled to the receiver input of the receiver, wherein the test unit is configured to change from a first state to a second state, and vice versa, wherein the test unit is configured, in the first state, to couple the test unit input to the first test unit output and to decouple the test unit input from the second test unit output, wherein the test unit is configured, in the second state, to decouple the test unit input from the first test unit output and to couple the test unit input to the second test unit output.

In one or more embodiments, the reducer is configured to generate an output voltage for the receiver based on a CAN Bus voltage from the CAN Bus interface, such that the output voltage is less than one tenth, one twentieth, or one thirtieth of the CAN Bus voltage.

In one or more embodiments, the CAN Bus interface is coupled to a reducer input of the reducer, wherein a reducer output of the reducer is coupled to the receiver input, and wherein the reducer is configured, if a test voltage from the second test unit output is present at the reducer output, to prevent the test voltage at the reducer output to cause an interference voltage at the reducer input, or to convert the test voltage at the reducer output into the interference voltage at the reducer input, such that the interference voltage is less than one tenth, one twentieth, or one thirtieth of the test voltage.

In one or more embodiments, a first control interface of the test unit is coupled to the transmitter such that the transmitter is controllable by the test unit via the first control interface.

In one or more embodiments, the test unit is configured to control the transmitter in the second state such that the transmitter generates a sender signal at the transmitter output.

In one or more embodiments, the first control interface of the test unit is coupled to the transmitter input, and wherein the test unit is configured to generate a digital reference signal and to send the reference signal to the transmitter input of the transmitter via the first control interface, and wherein the transmitter is configured to generate the sender signal at the transmitter output based on the reference signal.

In one or more embodiments, the test unit comprises an observer interface coupled to the receiver output of the receiver such that the test unit can receive an RXD signal from the receiver.

In one or more embodiments, the test unit is configured, in the second state, to compare a test message represented by the reference signal to at least one receive message represented by the RXD signal, and wherein the test unit is configured to determine whether the CAN transceiver is operating erroneously based on a result of the comparison.

In one or more embodiments, a second control interface of the test unit is coupled to a third control interface of the CAN transceiver, and wherein the test unit is configured to send a status signal via the second control interface, the status signal representing whether the CAN transceiver is operating erroneous.

In one or more embodiments, the test unit is coupled to the TXD interface, and wherein the test unit is configured to receive the TXD signal via the TXD interface, and wherein the test unit is configured to detect a transmission idle time in which no TXD signal is received via the TXD interface, and wherein the test unit is configured to prevent a change to the second state outside the transmission idle time.

In one or more embodiments, the test unit is configured, when the test unit is in the second state, to change to the first state at the end of the transmission idle time.

In one or more embodiments, the test unit is configured to detect a Bus idle time in which no CAN Bus signal is received via the CAN Bus interface, and wherein the test unit is configured to prevent a change to the second state outside the Bus idle time.

In one or more embodiments, the test unit is configured, when the test unit is in the second state, to change to the first state at the end of the Bus idle time.

In one or more embodiments, the test unit is operable to change to the second state while the transmit idle time and the Bus idle time are present simultaneously.

According to a second aspect of the present disclosure, a method for a CAN transceiver is provided, where the CAN transceiver comprising a transmit data, TXD, interface, a receiver data, RXD, interface, a CAN Bus interface, a transmitter, a reducer, and a test unit, wherein a transmitter input of the transmitter is coupled to the TXD interface for receiving a TXD signal, wherein a transmitter output of the transmitter is coupled to a test unit input of the test unit, and a first test unit output of the test unit is coupled to the CAN Bus interface, wherein the CAN Bus interface is coupled to a receiver input of the receiver via the reducer, wherein a receiver output of the receiver is coupled to the RXD interface, wherein a second test unit output of the test unit is coupled to the receiver input of the transmitter, wherein the test unit is configured to change from a first state to a second state, and wherein the method comprising the following steps: a) in the first state, coupling the test unit input to the first test unit output and decoupling the test unit input from the second test unit output; and b) in the second state, decoupling the test unit input from the first test unit output and coupling the test unit input to the second test unit output.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIGS. 5 to 7 show signal diagrams for a signal at the TXD input interface of a CAN transceiver, a signal resulting from an TXD signal at the TXD input interface, an a signal at a receiver input interface of a receiver of the CAN transceiver.

FIG. 8 shows depicts a simplified flow chart of a method for the CAN transceiver.

DESCRIPTION OF EMBODIMENTS

Figure 1:
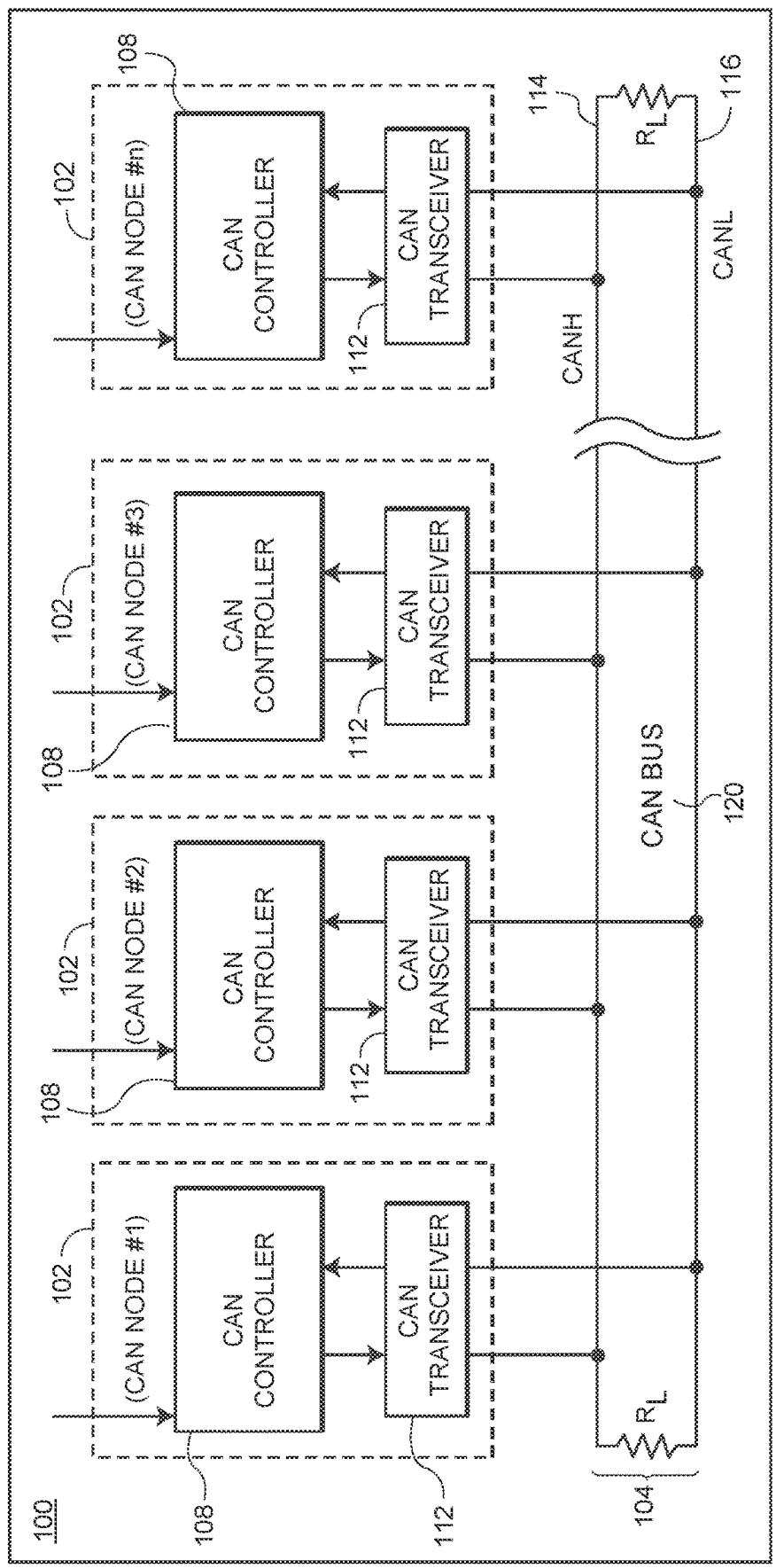
FIG. 1 shows a simplified block diagram of a CAN System.

FIG. 1 schematically depicts an example of a CAN system 100 that is known in the field. The CAN system may include multiple CAN devices 102, also referred to as CAN nodes 102 or "ECUs" 102, each connected to a CAN Bus network 104. In the embodiment of FIG. 1, each CAN device 102 includes a CAN protocol controller 108 and a CAN transceiver 112. The CAN protocol controller 108 may be embedded in a microcontroller of the CAN device 102. The CAN protocol controller 108 may be referred to as a CAN controller 108. The CAN transceiver 112 may be referred to as a transceiver 112.

The CAN controllers 108 are typically connected directly or indirectly to at least device outside the system 100, such as an switch, a main controller, an actuator, or some other control device. The CAN controllers 108 are often programmed to determine the meaning of received messages and to generate appropriate outgoing messages. A processing unit 204 of a CAN controller 108 may also be referred to as host processors, hosts or digital signal processors (DSPs). In an embodiment, the processing unit of the CAN controller supports application software that interacts with the interfaces 200, 202, 230 of the CAN controller 108.

The CAN Bus network 104 carries analog differential signals and includes a first CAN signal line 114, which is also referred to as the CAN high (CANH) bus line 114, and a second CAN signal line 116, which is also referred to as the CAN low (CANL) bus line 116. The CAN Bus network 104 is known in the field.

Figure 2:
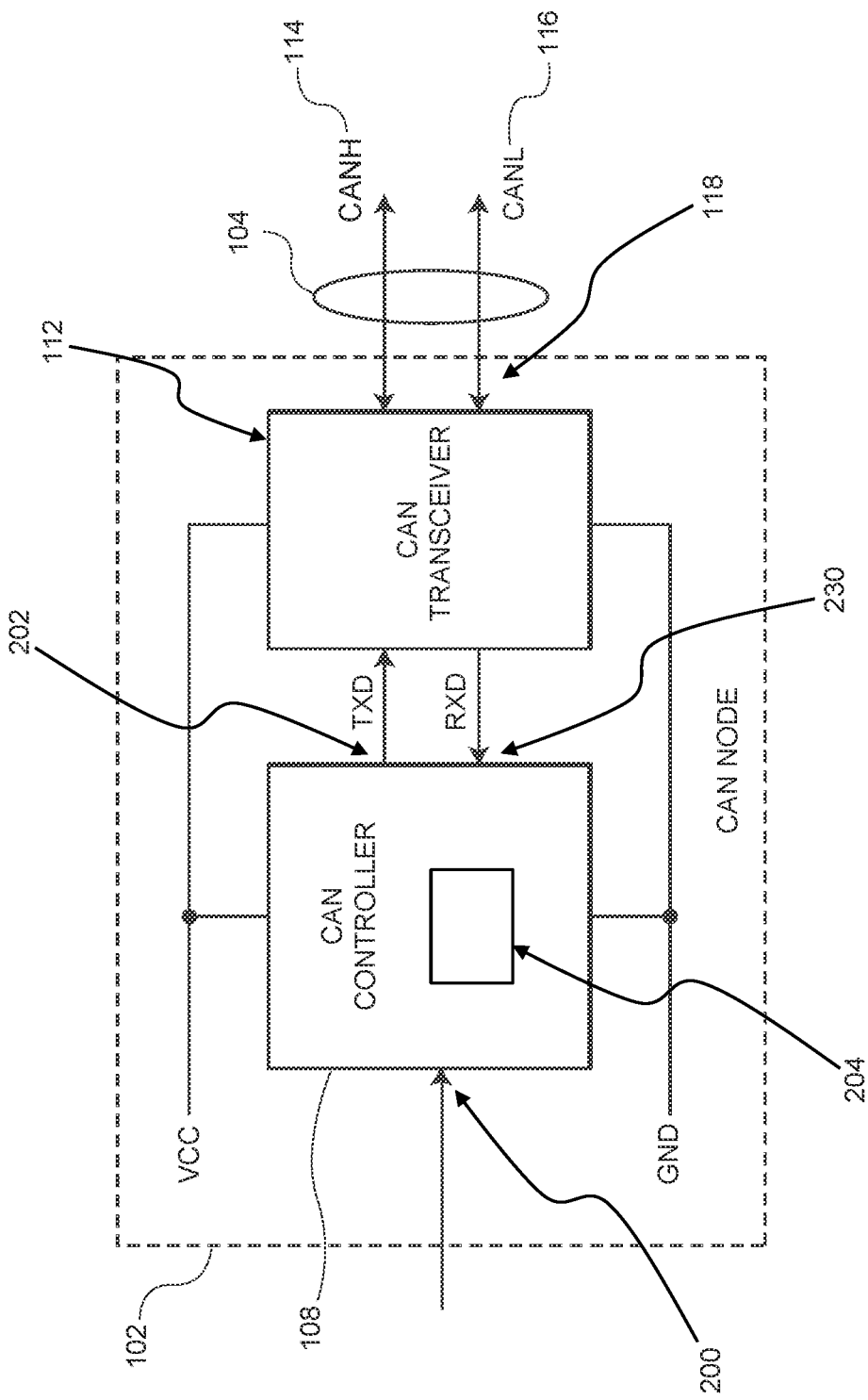
FIG. 2 shows a simplified block diagram of a CAN Device.

FIG. 2 depicts an expanded view of one CAN device 102 from FIG. 1. In the expanded view of FIG. 2, the CAN controller 108 comprises a processing unit 204, which may, for example, run a software application that is stored in a memory of the CAN controller 108 and executed by processing circuits of the CAN controller 108. The CAN controller 108 and the CAN transceiver 112 of the CAN device 102 are connected between a first supply voltage, VCC, and as second supply voltage, which is usually ground, GND. As illustrated in FIG. 2, data communicated from CAN controller 108 to the CAN transceiver 112 is identified as transmit data (TXD) and data communicated from the CAN transceiver 112 to the CAN protocol controller 108 is referred to as receive data (RXD). Throughout the description, TXD is carried on a TXD path and RXD is carried on an RXD path. The CAN transceiver comprises a Bus interface to communicate messages to and from the CAN Bus network 104 via the CANH and CANL bus lines 114 and 116, respectively.

The data link layer operations between the CAN protocol controller 108 and the CAN transceiver 112 is known in the field. For example, in receive operations, the CAN controller 108 receives from the transceiver 112 a digital RXD signal via the RXD path. The RXD signal may represent an CAN message. The CAN controller 108 may store the received CAN message. The CAN message complies with the frame format of the CAN protocol, in particular with the CAN FD format and/or the CAN XL format. In transmit operations, the CAN controller 108 transmits a TXD signal, which also represents a CAN message, via the TXD path to the CAN transceiver 112. The CAN message typically complies with the frame format of the CAN protocol, in particular with the CAN FD format and/or the CAN XL format.

The CAN transceiver 112 is located between the CAN controller 108 and the CAN Bus network 104. The CAN transceiver 112 is configured to implement physical layer operations according to the CAN protocol as known in the field.

For example, in receive operations, a CAN transceiver 112 converts analog differential signals from the CAN Bus network 104 to the RXD signal that the CAN controller 108 can interpret. The CAN transceiver 112 may also protects the CAN controller 108 from extreme electrical conditions on the CAN Bus network 104, e.g., electrical surges.

In transmit operations, the CAN transceiver 112 can convert the TXD signal received via the TXD path from the CAN controller 108 into analog differential signals that are sent over a CAN Bus interface 118 on the CAN Bus network 104. The CAN Bus interface 118 is adapted to be connected to the first and second CAN Bus signal lines 114, 116.

To test the operability of a CAN transceiver 112, it is possible for the CAN controller 108 to send a TXD test message to the CAN transceiver 112. Based on the TXD test message, the CAN transceiver 112 may generate a CAN Bus signal at the CAN Bus interface 118 representing the TXD test message. The CAN Bus signal is also sensed by the CAN transceiver 112, such that the CAN transceiver 112 generates an RXD test message based on the sensed CAN Bus signal. The RXD test message may be transmitted from the CAN transceiver 112 to the CAN controller 108. The CAN controller 108 may determine whether the CAN transceiver 112 is faulty based on a comparison between the TXD test message and the RXD test message. If the RXD test message corresponds to the TXD test message, there is no fault in the CAN transceiver 112.

Sending the CAN Bus signal representing the TXD message results in a load on the CAN Bus network 120. If a CAN system 100 includes a large number of CAN devices 102, and if the operability of the CAN transceiver 112 of each of the CAN devices 102 is tested, this results in a significant overall load on the CAN Bus network 120. It is desirable to avoid this significant overall load on the CAN Bus network.

Furthermore, testing the operability of a CAN transceiver 112 can lead to a significant expenditure of time, because the TXD test message must first win as part of the usual arbitration in accordance with the CAN standard, so that only the arbitration won the CAN transceiver 112 will generate the CAN Bus signal that represents the TXD test message. Until the arbitration is won, a significant time delay may have occurred. As a result, testing the operability of the CAN transceiver often involves a considerable amount of time during which the CAN transceiver 112 is not available to send regular TXD messages. It is desirable to reduce the aforementioned time expenditure.

Figure 3:
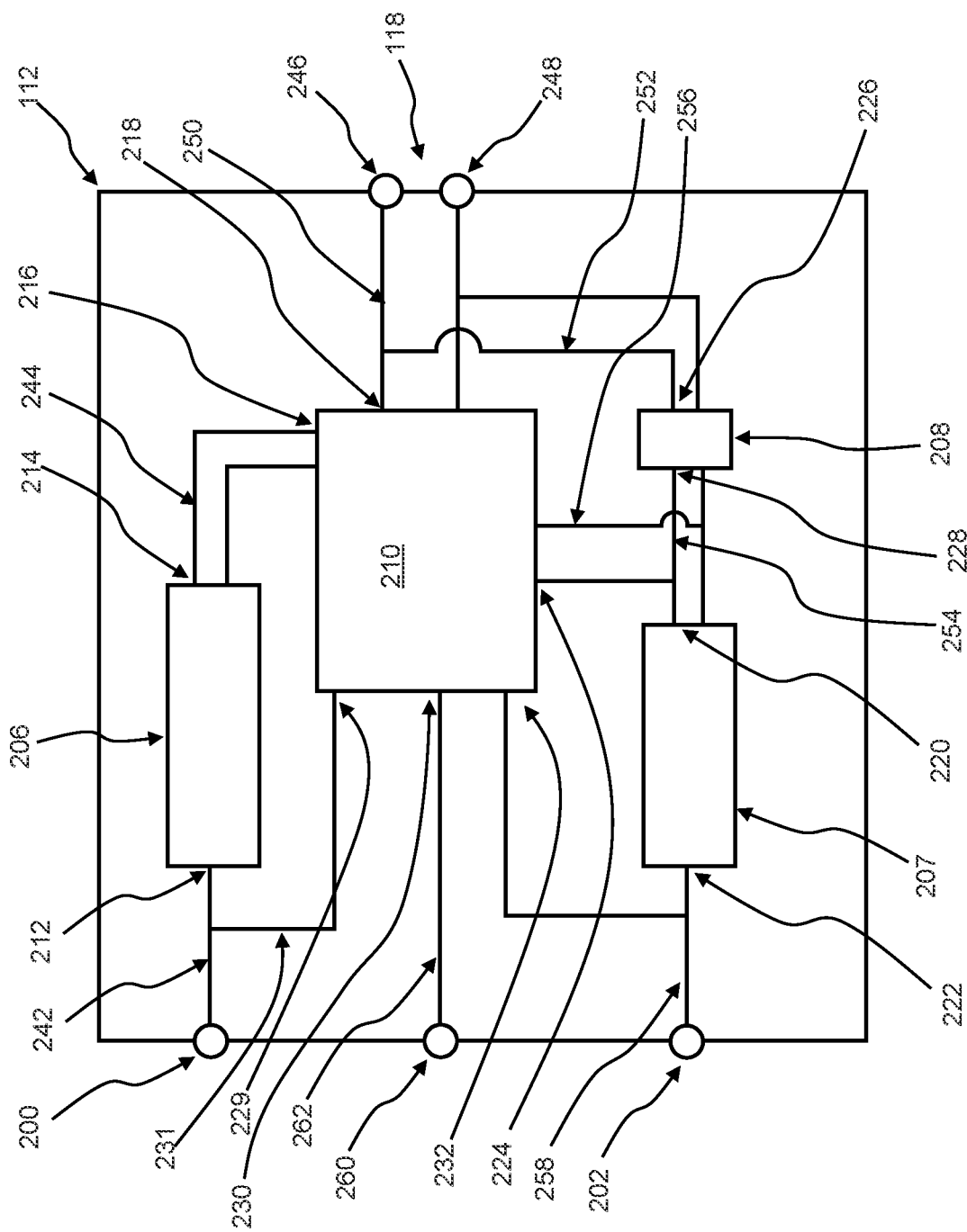
FIG. 3 shows a simplified block diagram of an embodiment of a CAN transceiver.

FIG. 3 schematically illustrates an example of a CAN transceiver 112 according to the present disclosure. This CAN transceiver 112 may be adapted to overcome the disadvantages previously explained. The CAN transceiver 112 has a transmit data (TXD) interface 200, a receive data (RXD) interface 202, a CAN Bus interface 118, a transmitter 206, a receiver 207, a reducer 208, and a test unit 210.

A transmit input 212 of the transmitter 206 is coupled to the TXD interface 200 to receive a TXD signal. In an example, a signal connection 242 may be provided extending from the TXD interface 200 to the transmitter input 212 of the transmitter 206. The signal connection 242 may be used to direct the TXD signal from the TXD interface 200 to the transmitter input 212. The transmitter 206 may also be referred to and/or configured as a transmitter unit 206. The transmitter 206 may be configured to generate a CAN Bus signal at a transmitter output 214 of the transmitter 206 based on a digital signal, particularly the TXD signal, received by the transmitter 206 at the associated transmitter input 212. The CAN Bus signal is preferably a differential voltage signal, preferably formed in accordance with the CAN standard. The transmitter output 214 of the transmitter 206 may have at least two terminals, such that the differential voltage signal may be provided between these two terminals.

A transmitter output 214 of the transmitter 206 is coupled to an input 216 of the test unit 210. The input 216 of the test unit 210 is also referred to as the test unit input 216. The test unit input 216 may have two terminals, such that the differential voltage signal may be applied between the two terminals of the test unit input 216. Preferably, a signal connection 244 is provided extending from the transmitter output 214 of the transmitter 206 to the test unit input 216 of the test unit 210. The signal connection 244 allows the CAN Bus signal generated by the transmitter 206 to be transmitted to the test unit 210. A differential voltage signal that may form the CAN Bus signal may thus be transmitted from the transmitter output 214 to the test unit input 216 through the signal connection 244. The signal connection 244 may include at least two lines that may be used to transmit the differential voltage signal.

The test unit 210 may have two outputs 218, 224, referred to as the first test unit output 218 and the second test unit output 224. The first test unit output 218 of the test unit 210 is coupled to the CAN Bus interface 118. The CAN Bus interface 118 may include two terminals 246, 248. The first test unit output 218 may also have two terminals. Preferably, a signal connection 250 is provided extending from the first test unit output 218 to the CAN Bus interface 118. The signal connection 250 may have two lines so that each terminal of the first test unit output 218 may be connected to exactly one terminal 246, 248 of the CAN Bus interface 118.

The CAN Bus interface 118 is coupled to a receiver input 220 of the receiver 207 via the reducer 208. The receiver 207 may also be referred to as the receiver unit 207. The reducer 208 may also be referred to as the reducer unit 208. An input 226 of the reducer 208 may also be referred to as the reducer input 226. The reducer input 226 may have two terminals. A signal connection 252 may extend from the CAN Bus interface 118 to the reducer input 226. The signal connection 252 may comprise two lines. Each terminal 246, 248 of the CAN Bus interface 118 may be connected to exactly one terminal of the reducer input 226 by one line of the signal connection 252. If a differential voltage signal is generated as a CAN Bus signal via the CAN Bus network 120 between the terminals 246, 248 of the CAN Bus interface 118, this differential voltage signal is also routed to the reducer input 226 via the signal connection 252. This creates a differential voltage between the terminals of the reducer input 226.

Preferably, the reducer 208 includes an output 228, which may also be referred to as the reducer output 228. Preferably, the reducer output 228 is coupled to the receiver input 220 of the receiver 207. A further signal connection 254 may extend from the reducer output 228 to the receiver input 220 of the receiver 207. The reducer output 228 may include two terminals. Further, the receiver input 220 of the receiver 207 may also comprise two terminals. The signal connection 254 may comprise two lines. Each terminal of the reducer output 228 may be connected to exactly one terminal of the receiver input 220 via a line of the signal connection 254.

The second test unit output 224 of the test unit 210 is preferably coupled to the receiver input 220 of the receiver 207 via another signal connection 256. The second test unit output 224 may include two terminals. The signal connection 256 may comprise two lines. Each terminal of the second test unit output 224 may be coupled to exactly one terminal of the receiver input 220 via one line of the signal connection 256. Therefore, the receiver input 220 may be coupled to both the reducer output 228 and the second test unit output 224.

The output 222 of the receiver 207 is also referred to as the receiver output 222. The receiver output 222 is coupled to the RXD interface 202. In an example, another signal connection 258 extends from the receiver output 222 to the RXD interface 202.

The receiver 207 may receive a differential voltage signal at the receiver input 220. The differential voltage signal may be routed from the reducer 208 to the receiver input 220 via the signal connection 254 and/or from the test unit 210 to the receiver input 220 of the receiver 207 via the signal connection 256. The receiver 207 may also be referred to as a receiver unit. The receiver 207 is preferably configured to generate an RXD signal at the receiver output 222 based on the differential voltage signal received at the receiver input 220. The RXD signal is a digital signal. The RXD signal may be routed to the RXD interface 202 via the signal connection 258.

Preferably, the CAN Bus interface 118 is connected to the reducer input 226 of the reducer 208 via the signal connection 252. Therefore, the same CAN Bus signal may be at the reducer input 226 as at the CAN Bus interface 118. Preferably, the reducer 208 is configured to generate a signal based on the CAN Bus signal. The generated signal may also be referred to as the reducer signal. The reducer 208 is preferably a unit of the transceiver 112, wherein the reducer 208 may comprise a circuit arrangement. The circuit arrangement may be used to generate a voltage signal at the output 228 of the reducer 208 based on a voltage, reduced by a predetermined factor, of a further voltage signal applied to the input 226 of the reducer 208. Against this background, the term "reducer" is used to refer to the circuit arrangement and/or other suitable units of the transceiver 112 that are coupled between the CAN Bus interface 118 and the transmitter input 220. In an example, the reducer 208 is configured to reduce a voltage of the CAN Bus signal applied to the reducer input 226 by a predetermined factor such that the CAN Bus signal reduced by that factor forms the reducer signal at the reducer output 228. If a message is represented by the CAN Bus signal, the same message is also represented by the reducer signal.

The reducer signal is preferably also a differential voltage signal. The reducer signal may also be referred to as a signal generated by the reducer 208. The reducer signal may be transmitted to the receiver input 220 via the signal connection 254. The receiver 207 may be configured to generate an RXD signal based on the reducer signal. If the reducer signal represents a message, then the receiver will generate the RXD signal such that the RXD signal represents the same message.

The test unit 210 is configured to change from a first state of the test unit 210 to a second state of the test unit 210. The test unit 210 may further be configured to change from the second state of the test unit 210 back to the first state of the test unit 210. The first state of the test unit 210 may also be referred to as the first state. The second state of the test unit 210 may also be referred to as the second state.

The test unit 210 may include a control input 230. The control input 230 may also be referred to and/or formed as a second control interface 230. The test unit 210 may be configured to receive a first control signal via the control input 230. Further, the test unit 210 may be configured to change from the first state to the second state based on the first control signal. The test unit 210 may also be configured to change from the second state to the first state based on the first control signal. The first control signal may be used to control a change between the two states of the test unit 210.

In an example, the transceiver 112 includes a third control interface 260. The third control interface 260 may be coupled to the control input 230 of the test unit 210 via another signal connection 262. The first control signal can be routed from the third control interface 260 to the control input 230 via the signal connection 262.

In the first state, the test unit 210 is configured to couple the first test unit input 216 to the first test unit output 218. Further, the test unit 210 may be configured to decouple the first test unit input 216 from the second test unit output 224 in the first state.

In the second state, the test unit 210 is configured to couple the first test unit input 216 to the second test unit output 224. Further, the test unit 210 may be configured to decouple the first test unit input 216 from the first test unit output 218 in the second state.

The transmitter 206 may receive a TXD signal at the associated transmitter input 212 via the TXD interface 200 and signal connection 242. The TXD signal may represent a CAN message intended for a remote CAN device 102. The CAN message may be formed in accordance with the CAN standard previously explained. The transmitter 206 may be configured to generate a CAN Bus signal at the transmitter output 214 based on the TXD signal, such that the CAN Bus signal represents the CAN message. In an example, to direct the CAN Bus signal to the CAN Bus interface 118, it may be provided that the test unit 210 is in the first state. In the first state, the test unit input 216 is coupled to the first test unit output 218. Therefore, in said example, the CAN Bus signal generated by the transmitter 206 at the transmitter output 214 may be routed to the CAN Bus interface 118 via the signal connection 244, the test unit 210, and the signal connection 250. In the first state of the test unit 210, the second test unit output 224 is preferably decoupled from the test unit input 216 so that the CAN Bus signal cannot travel from the test unit input 216 to the second test unit output 224 via the test unit 210.

If the test unit 210 is in the first state, the CAN transceiver 112 may operate like a regular CAN transceiver 112 if viewed from the outside.

It is desirable to be able to test the operability of the CAN transceiver 112 without such a test of the operability of the CAN transceiver 112 resulting in a CAN Bus signal according to the CAN standard at the CAN Bus interface 118 and/or on the CAN Bus network 120. A CAN communication via the CAN Bus 120 shall not be influenced by the test of the operability of the CAN transceiver 112 as far as possible with reasonable effort.

To perform the test of the operability of the CAN transceiver 112, the test unit 210 of the CAN transceiver may be transitioned from the first state to the second state. In an example, a first control signal may first be transmitted via the third control interface 260 of the CAN transceiver 112 and via the signal connection 262 to the control input 230 of the test unit 210. The first control signal may represent an instruction for testing the operability of the CAN transceiver 112. The test unit 210 may be configured to change from the first state to the second state based on the received first control signal.

In the second state, the test unit input 216 is coupled to the second test unit output 224. Preferably, in the second state, the test unit input 216 is decoupled from the first test unit output 218. A digital reference signal representing a test message may be provided to the transmitter input 212 of the transmitter 206.

The test unit 210 may include a first control interface 229. The first control interface 229 may be coupled to the transmitter 206. In an example, a signal connection 231 extends from the first control interface 229 to a transmitter input 212 of the transmitter 206. Therefore, the test unit 210 may be coupled to the transmitter input 212 via the signal connection 231.

In the second state, the test unit 210 may further be configured to generate the reference signal representing the test message. In the second state, the test unit 210 may be configured to transmit the reference signal to the transmitter input 212. In an example, the test unit 210 may generate the reference signal at the first control interface 229 such that the reference signal is transmitted from the first control interface 229 to the transmitter input 212 of the transmitter 206 via the signal connection 231. The transmitter 206 may be configured to generate a signal at the transmitter output 214 based on the reference signal. The generated signal may be referred to as the transmitter signal. The transmitter signal may also represent the test message. Preferably, the transmitter signal is a differential voltage signal.

In the second state, the test unit 210 may be configured to generate a signal at the second test unit output 224 based on the transmitter signal. This signal generated by the test unit 210 may be designated as a test signal. The test signal may be configured as a differential voltage signal. In an example, in the second state and preferably in combination with the reducer 208, the test unit 210 may be configured to reduce a (or each) voltage of the transmitter signal applied to the test unit input 216 by a predetermined factor such that the transmitter signal reduced by that factor forms the test signal. The test signal may also represent the test message. The test signal may be transmitted to the receiver input 220 of the receiver 207 via the signal connection 256. Based on the test signal, the receiver 207 may generate an RXD signal representing the test message.

In an example, the first control signal may have been transmitted from a CAN controller 108 to the third control interface 260. Further, the RXD interface 202 may be coupled to the CAN controller 108. If the CAN controller 108 receives an RXD signal from the CAN transceiver 112 in response to the first control signal, where the RXD signal representing the test message, the CAN controller 108 may determine that the operability of the CAN transceiver 112 is not faulty based on the RXD signal.

The CAN transceiver 112 offers several advantages. If the test unit 210 of the CAN transceiver 112 is in the first state, the CAN transceiver 112 can operate like a regular CAN transceiver 112. However, the CAN transceiver 112 also offers the possibility that the operability of the CAN transceiver 112 can be tested without blocking and/or significantly interfering with the communication over the CAN Bus network 120. Rather, a test of the operability of the CAN transceiver 112 can be performed without adversely affecting other CAN devices 102. For testing the operability of the CAN transceiver 112, the test unit 210 may be transitioned to the second state. In the second state, a signal generated by the transmitter 206 can be effectively prevented from being directly routed to the CAN Bus interface 118. In fact, in the second state, the test unit 210 is configured to route a signal generated by the transmitter 206, preferably a signal reduced by a predetermined factor of the signal generated by the transmitter 206, to the receiver 207. Transitioning the test unit 210 to the second state may therefore create a signal path, also referred to as a test signal path, extending from the TXD interface through the transmitter 206, the test unit 210 and the receiver 207 to the RXD interface 202. The test signal path may therefore include all major components of the CAN transceiver 112. The test signal path may exclude the CAN Bus interface 118. The test signal path may be excited at the TXD interface 200 with a reference signal. The RXD signal caused by the reference signal may be sensed at the RXD interface 202. By comparing the message represented by the reference signal with the message represented by the RXD signal, it may be determined whether the operability of the CAN transceiver 112 is faulty. For example, the operability of the CAN transceiver 112 is faulty if the two previously mentioned messages differ. In another example, the operability of the CAN transceiver 112 may not be faulty if the two previously mentioned messages correspond to each other, in particular if both messages are identical.

The CAN transceiver 112 also offers the advantage that a test of the operability of the CAN transceiver 112 can be performed in a very short period of time. In an example, the reference signal used to test the operability does not necessarily have to represent a complete frame according to the CAN standard. In an example, it is possible for the reference signal to represent just exactly one bit, two bits, or a predetermined number of bits. The number of bits of the reference signal may be smaller than the minimum number of bits for a frame according to the CAN standard. For example, if the reference signal represents exactly one bit, only a very short time period is used until an RXD signal is caused by the reference signal. If only a very short period of time is required to test the operability of the CAN transceiver 112, the test can often be performed while the CAN transceiver 112 is in operation. For example, if no regular CAN messages are to be sent over the CAN Bus network 120 for a predetermined time, this time may be used to test the operability of the CAN transceiver 112. As an effect, the operability test of the CAN transceiver 112 can be performed without blocking and/or effecting the CAN Bus interface 118 and/or the CAN Bus network 120.

Figure 4:
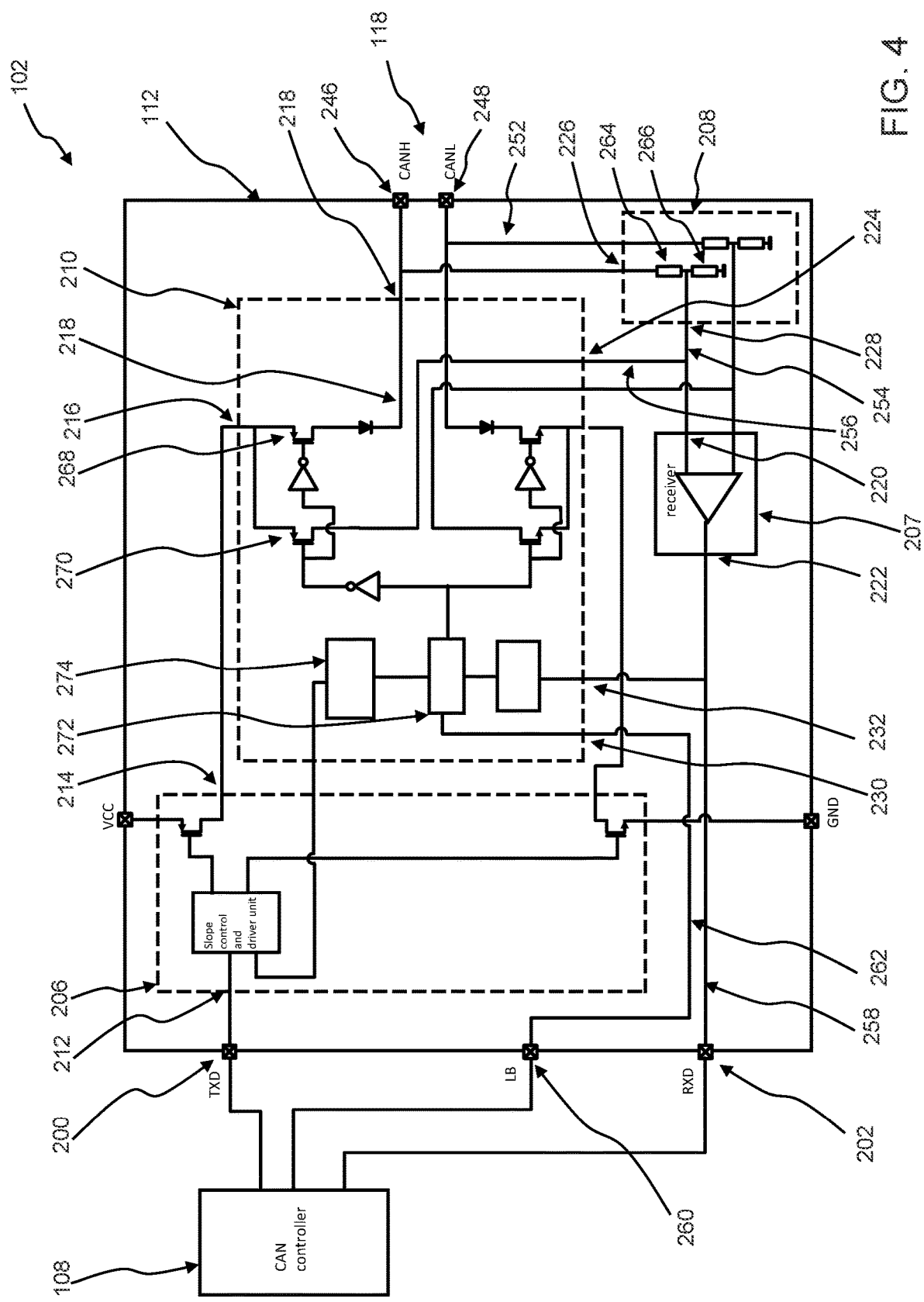
FIG. 4 shows a simplified block diagram of another embodiment of a CAN transceiver.

FIG. 4 schematically illustrates an example of an embodiment of the CAN transceiver 112. The preceding explanations, preferred features, technical effects and advantages may apply to the CAN transceiver 112 of FIG. 4 in an analogous manner as they have been explained for the CAN transceiver 112 of FIG. 3.

The reducer 208 may be configured to generate an output voltage for the receiver 207 based on a CAN Bus voltage at the CAN Bus interface 118 such that the output voltage is less than one-tenth of the CAN Bus voltage, less than ½₀th of the CAN Bus voltage, or less than ⅓₀th of the CAN Bus voltage.

A differential voltage may be present between the two terminals 246, 248 of the CAN Bus interface 118, formed by a voltage difference between a first voltage at the terminal 246 and a second voltage at the terminal 248. The CAN Bus voltage of the CAN Bus interface 118 may relate to the first voltage, to the second voltage at, or to either of the first and second voltages.

In an example, the reducer input 226 of the reducer 208 may have two terminals. Each of the two terminals of the reducer input 226 may be connected to exactly one of the two terminals 246, 248 of the CAN Bus interface 118 via a line of the signal connection 252. The reducer 208 may include two voltage dividers, each voltage divider including a series connection of a first electrical resistor 264 and a second electrical resistor 266. Each of the two terminals of the reducer input 226 of the reducer 208 may be connected to exactly one of the two voltage dividers. Each of the two voltage dividers may extend between exactly one terminal of the reducer input 226 and a reference potential, preferably ground. The reducer output 228 of the reducer 208 may have two terminals. Each of the two terminals of the reducer output 228 may be connected to exactly one of the two voltage dividers, such that the respective terminal of the reducer output 228 is electrically connected to a node between the two electrical resistors 264, 226 of the respective voltage divider. For the terminal of the reducer output 228 and the terminal of the reducer input 226 connected to the same voltage divider, it may be the case that the electrical voltage applied to the terminal of the reducer output 228 is a proportion of the electrical voltage applied to the terminal of the reducer input 226. The proportion may be determined by the values of the electrical resistors 264, 266, i.e., as in a common voltage divider. Therefore, by appropriately selecting the electrical resistors 264, 266, the reducer 208 may be configured to produce an output voltage at a terminal of the reducer output 228 based on a voltage at a terminal of the reducer input 226 such that the output voltage is less than one-tenth, less than one-twentieth, or less than one-thirtieth of the electrical voltage at the terminal of the reducer input 226. The preceding explanations, preferred features, technical effects, and advantages may apply in an analogous manner to the second terminal of the reducer output 228, the second voltage divider, and the second terminal of the reducer input 226. The reducer 208 may therefore be configured as a circuit arrangement.

FIG. 6 shows a schematic example of a CAN Bus signal. The CAN Bus signal is preferably formed by a differential voltage signal. The differential voltage signal may be formed by a first voltage signal at the first terminal 246 of the CAN Bus interface and a second voltage signal at the second terminal 248 of the CAN Bus interface 118. The first voltage signal is represented by a dashed line in the example shown in FIG. 6. The second voltage signal is represented by a dotted line in the example shown in FIG. 6. Without taking into account the rising and falling edges, in the first time period T1 the voltage of the first voltage signal is 3.5 V and the voltage of the second voltage signal is 1.5 V. The resulting differential voltage signal in the first time period T1 may represent a recessive bit. In an example, the reducer 208 is configured to reduce the voltages of the two voltage signals by a factor of 1/43. The respective voltages reduced by this factor are applied to the terminals of the reducer output 228. An example of the reducer signal is shown schematically in FIG. 7 for the first time period T1.

As schematically illustrated, the reducer signal is preferably formed by a differential voltage signal. The differential voltage signal may be formed by a third voltage signal at one of the two terminals of the reducer output 228 and by a fourth voltage signal at the other terminal of the reducer output 228. In the example, the third voltage signal is represented by a dashed line in the first time period T1 of FIG. 7. The fourth voltage signal is represented by a dotted line in the example shown in FIG. 7 in the first time period T1. Excluding the rising and falling edges, in the first time period T1 the voltage of the third voltage signal is about 80 mV (3.5 V/43) and the voltage of the fourth voltage signal is about 35 mV (1.5 V/43). The resulting differential voltage signal in the first time period T1 may represent the same recessive bit. The receiver 207 may be configured to generate a digital output signal based on the reducer signal. In the example previously explained, the receiver 207 may be configured to generate a digital recessive bit ("1") based on the reducer signal according to the differential voltage in the first time period T1.

In an example, the test unit 210 may include at least one first switch unit 268, particularly a PMOS transistor and an NMOS transistor, disposed in a signal path between the first test unit input 216 and the first test unit output 218. The at least one first switch unit 268 can be used to couple the first test unit input 216 to the first test unit output 218 in the first state of the test unit 210, or to decouple the first test unit input 216 from the first test unit output 218 in the second state of the test unit 210.

In an example, the test unit 210 may include at least one second switch unit 270, particularly a PMOS transistor and an NMOS transistor, disposed in a further signal path between the first test unit input 216 and the second test unit output 224. Via the at least one second switch unit 270, the first test unit input 216 can be coupled to the second test unit output 224 in the second state of the test unit 216 or decoupled from the second test unit output 224 in the first state of the test unit 210.

The test unit 210 may include a circuit arrangement 272 configured to control the at least one first switch unit 268 and to control the at least one second switch unit 270. The circuit arrangement 272 may be coupled to the switch units 268, 270 via signal connections and in particular further components to control these switch units 268, 270. The circuit arrangement 272 may further be coupled to the first control terminal 230. The circuit arrangement 272 may be configured to control, based on the first control signal, the switch units 268, 272 such that the test unit 210 is either in the first state or in the second state.

In an example, the at least one second switch unit 270 is configured such that if the second switch unit 270 in a closed state (switch closed), then the second switch unit 270 forms an electrical resistance equal to the value of the first electrical resistance 264 of the reducer 208 preferably with a deviation of less than 20% or less than 10%. The electrical resistance in the closed state of the switch unit 270 may also be referred to as the switch resistance. In the second state of the test unit 210, the second switch unit 270 may be in a series connection with the second electrical resistor 266 of the reducing member 208, such that the switch resistance of the second switch unit 270 and the second electrical resistor 266 also form a voltage divider. This voltage divider may be analogous to the voltage divider formed by the first electrical resistor 264 and the second electrical resistor 266, at least for the electrical resistance values.

In an example, a transmitter signal may be generated by the transmitter 206 based on a reference signal at the transmitter input 212. If the test unit 210 is in the second state, a test signal is generated at the second test unit output 224 based on the transmitter signal by the voltage divider comprising the second switch unit 270 and the second electrical resistor 266 of the reducer 208. Such a test signal is schematically shown, for example, in the time period T3 of FIG. 7. The test signal is preferably formed by a differential voltage signal. The differential voltage signal may be formed from a fifth voltage signal at one of the two terminals of the second test unit output 224 and from a sixth voltage signal at the other terminal of the second test unit output 224. In an example, the fifth voltage signal is represented by a dashed line in the time period T3 of FIG. 7. The sixth voltage signal is represented by a dotted line in the example shown in FIG. 7 in the time period T3. Excluding the rising and falling edges, in the time period T3 the voltage of the fifth voltage signal is about 80 mV and the voltage of the sixth voltage signal is about 35 mV. The resulting differential voltage signal in the time period T3 may represent a recessive bit. The transmitter 207 may be configured to generate a digital recessive bit ("1") based on the test signal according to the aforementioned differential voltage in the time period T3.

Due to the small electrical voltages for the test signal and due to the voltage divider of the reducer 208, it can be effectively prevented that the test signal would lead to a relevant disturbance at the CAN Bus interface 118 and/or to a relevant disturbance on the CAN Bus network 120. Investigations have shown that the test signal can be approximately barely detected on the CAN Bus network 120. Therefore, it can also be said that the test signal has no relevant negative influence on the communication via the CAN Bus network 120.

In an example, the CAN Bus interface 118 is coupled to the reducer input 226 of the reducer 208. In an example, the signal connection 252 may extend from the CAN Bus interface 118 to the reducer input 226. The reducer output 228 of the reducer 208 may be coupled to the receiver input 220 of the receiver 207. The signal connection 254 may extend from the reducer output 228 to the receiver input 220. The reducer 208 may be configured, if a test voltage of the test signal from the second test unit output 224 is applied to the reducer output 228, to prevent the test voltage from causing a disturbance voltage at the reducer input 226. Alternatively, the reducer 208 may be configured to convert the test voltage at the reducer output 228 to a (preferably very small) disturbance voltage at the reducer input 226 such that the disturbance voltage is less than one-tenth, less than one-twentieth, or less than one-thirtieth of the test voltage. In either case, the reducer 208 can ensure that the test signal does not cause a relevant disturbance on the CAN Bus interface 118 and/or on the CAN Bus network 120.

As previously discussed, the first control interface 229 of the test unit 210 may be coupled to the transmitter input 212. The test unit 210 may be configured to generate a digital reference signal. The test unit 210 may further be configured to transmit the reference signal to the transmitter input 212 of the transmitter 206 via the first control interface 229, and preferably via the signal connection 231. The transmitter 206 may be configured to generate the transmitter signal based on the reference signal. If the reference signal represents at least one test bit, the transmitter may generate the transmitter signal based on the reference signal such that the transmitter signal represents the same at least one test bit.

In an example, the duration of a test bit is either less than or greater than the duration of a bit according to the CAN standard. If the test unit 210 is in the second state, the test unit 210 may generate a test signal based on the transmitter signal such that the test signal represents the same at least one test bit. The receiver 207 may be configured to generate an RXD signal based on the test signal that represents the same at least one test bit. In an example, the receiver 207 may be configured to generate the RXD signal based on the test signal even if the at least one test bit each has a duration that is either less than or greater than a duration of a bit according to the CAN standard (standard bit). If the duration of a test bit is shorter than the duration of a standard bit, the operability test can be performed very quickly.

In an example, the test unit 210 may include an observer interface 232. The observer interface 232 may be coupled to the receiver output 222 of the receiver 207, such that the test unit 210 may receive an RXD signal from the receiver 207. The test unit 210 may be configured to compare, in the second state, a test message represented by the reference signal with at least one received message represented by the RXD signal. The comparison may be performed by the circuitry arrangement 272 of the test unit 210. The test message may be composed of a plurality of test bits. If the transceiver 112 is not faulty, the test message causes an RXD signal representing the receive message, where the receive message corresponds to the test message. However, if the transceiver 112 is faulty, the test message will also cause an RXD signal representing a receive message. This receive message will differ from the test message if the transceiver 112 is faulty. Therefore, by comparing the test message with the receive message, it can be determined whether the CAN transceiver 112 is operating faulty. The test unit 210 may be configured to determine whether the transceiver 112 is operating faulty based on a result of the comparison performed by the test unit 210. In an example, the test unit 210 may be configured to determine, based on a result of the comparison, whether the CAN transceiver 112 is operating either faulty or faulty-free. In an example, the transceiver 112 may be operating faulty-free if the CAN transceiver 112 is operating as expected. In an example, this may be the case if the test message corresponds to the receive message.

In an example, the test message may be represented by the reference signal. The test unit 210 may include a signal generator 274 for generating the reference signal. The circuit arrangement 272 may be coupled to the signal generator 274, such that the signal generator 274 is controllable by the circuit arrangement 272. The circuit arrangement 272 may receive a first control signal via the control input 230. The first control signal may represent the instruction to change to the second state. The circuit arrangement 272 may change the test unit 210 to the second state based on the first control signal if the second control signal represents the instruction to change to the second state and control the signal generator 274 such that the signal generator 274 generates the reference signal at the first control interface 229, the reference signal representing the test message.

Previously, as an example, it was explained that the transceiver 112 may include the third control interface 260, which is preferably coupled to the control input 230 of the test unit 210 via another signal connection 262. The control input 230 may be configured as the second control interface 230. The second control interface 230 may be formed as a bidirectional control interface 230 to receive the previously explained, first control signal and to send a status signal. In an example, the test unit 210 may be configured to generate and send the status signal via second control interface 230. The status signal may be routed via the signal connection 262 to the third control interface 260.

FIG. 4 shows an example of an embodiment of the CAN device 102, where the third control interface 260 can be coupled to the CAN controller 108 via a further signal connection. Therefore, the status signal can be sent to the CAN controller 108 via this further signal connection. The test unit 210 of the CAN transceiver 112 may be configured to generate the status signal based on the result of the comparison between the test message and the received message and/or based on a comparison between the reference signal and the test signal. The test unit 210 may generate the status signal such that the status signal represents whether the CAN transceiver 112 is faulty. In particular, this is the case if the comparison shows a difference between the message represented by the reference signal and the message represented by the RXD signal. In an example, the test unit 210 may generate the status signal such that the status signal represents whether the transceiver 112 is operating faulty-free. In particular, this is the case if the comparison shows no difference or no relevant difference between the message represented by the reference signal and the message represented by the RXD signal. In an example, the status signal may either represent that the CAN transceiver 112 is operating faulty or the status signal may represent that the CAN transceiver 112 is operating faulty-free.

FIG. 5 schematically shows an example of a signal load at the TXD interface 200 of the CAN transceiver 112. In the hatched sections, a TXD signal is transmitted to the TXD interface 200. In a period T2 between the hatched sections, no TXD signal is received via the TXD interface 200. In FIG. 6, an example of a signal waveform of the differential voltage signal at the CAN Bus interface 118 of the CAN transceiver 112 is schematically shown. As previously explained, the differential voltage signal may be formed from a first voltage signal at the first terminal 246 of the CAN Bus interface 118 and from a second voltage signal at the second terminal 248 of the CAN Bus interface 118. The time period T4 is shown in abbreviated form in FIGS. 5 and 6, such that the signal waveform in time period T4 schematically represents only a portion of the signal waveform from time period T1.

As can be seen schematically from the example shown in FIG. 3, the test unit 210 may be coupled to the TXD interface 200. The test unit 210 may be configured to receive the at least one TXD signal via the TXD interface 200. FIG. 5 schematically illustrates an example according to which a TXD signal is transmitted to the TXD interface 200 of the CAN transceiver 112 in the time periods T1 and T4. Between these two time periods T1, T4 there is the transmission idle time T2. The test unit 210 of the CAN transceiver 112 may be configured to detect the transmission idle time T2, in which no TXD signal is received via the TXD interface 200. It is desirable not to use the periods T1, T4 for testing the operability of the CAN transceiver 112. Rather, the idle period T2 is suitable for checking the operability of the CAN transceiver 112. The test unit 210 is configured to prevent a change to the second state outside the transmission idle period T2. As an effect, sending of regular messages is not interrupted and/or negatively affected. In an example, the test unit 210 may be configured to change to or be in the second state only during the transmission idle time T2. Further, if the test unit 210 is in the second state, the test unit 210 may be configured to change to the first state at the end of the transmission idle time T2. In the first state of the test unit 210, regular generation of a CAN Bus signal based on a TXD signal may be performed by the CAN transceiver 112. In the second state of the test unit 210, the operability of the CAN transceiver 112 may be checked.

As previously explained, the test unit 210 may include an observer interface 232 that is preferably coupled to the receiver output 222 of the receiver 207 so that the test unit 210 can receive an RXD signal from the receiver 207. If the test unit 210 is in the first state, the receiver 207 generates the RXD signal based on the CAN Bus signal. The CAN Bus signal is a differential voltage signal, which is schematically shown in an example in FIG. 6. During the time period T2, no TXD signal is received via the TXD interface 200. Furthermore, if no CAN Bus signal is generated at the CAN Bus interface 118 from another CAN device 102 via the CAN Bus network 120, the time period T5 may coincide with the previously mentioned time period T2. Therefore, in the time period T5, there is no CAN Bus signal at the CAN Bus interface 118. Therefore, the time period T5 may also be referred to as bus idle time T5.

In an example, the test unit 210 may be configured to detect the bus idle time T5 in which no CAN Bus signal is received via the CAN Bus interface 118. The test unit 210 may be configured to prevent a change to the second state outside of the bus idle time T5. In an example, the test unit 210 may be configured to be in the second state only during the bus idle time T5. Further, if the test unit 210 is in the second state, the test unit 210 may be configured to change to the first state at the end of the bus idle time T5.

Provided that a CAN Bus signal is sent from another CAN device 102 via the CAN Bus network 120, the transmission idle time T2 and the Bus idle time T5 may be different. In an example, the test unit 210 is configured to change to the second state while the transmission idle time T2 and the Bus idle time T5 exist simultaneously. In an example, the test unit 210 may automatically change to the second state. In another example, change to the second state may require prior receipt of the first control signal. The first control signal may represent a request to change to the second state. The test unit 210 may be configured to change to the second state based on the first control signal once the Bus idle time T5 exists or once the transmission idle time T2 and the Bus idle time T5 exist simultaneously.

In an example of the present disclosure, a method is provided for the CAN transceiver 112, wherein the CAN transceiver 112, includes a transmit data, TXD, interface 200, a receiver data, RXD, interface 202, a CAN Bus interface 118, a transmitter 206, a reducer 208, and a test unit 210, wherein a transmitter input 212 of the transmitter 206 is coupled to the TXD interface 200 to receive a TXD signal, wherein a transmitter output 214 of the transmitter 206 is coupled to a first test unit input 216 of the test unit 210, and wherein a first test unit output 218 of the test unit 210 is coupled to the CAN Bus interface 118, wherein the CAN Bus interface 118 is coupled to a receiver input 220 of the receiver 207 via the reducer 208, wherein a receiver output 222 of the receiver 207 is coupled to the RXD interface 202, wherein a second test unit output 224 of the test unit 210 is coupled to the receiver input 220 of the receiver 207, wherein the test unit 210 is configured to change from a first state to a second state. As schematically illustrated in FIG. 8, the method may comprise the steps of:
  a) in the first state, coupling the first test unit input 216 to the first test unit output 218 and decoupling the first test unit input 216 from the second test unit output 224.
  b) in the second state, decoupling the first test unit input 216 from the first test unit output 218 and coupling the first test unit input 216 to the second test unit output 224.

For the method, reference is made to the preferred explanations, advantageous features, technical effects and advantages in an analogous manner as previously explained for the CAN transceiver 112.

Although the described exemplary embodiments disclosed herein focus on devices, systems, and methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A controller area network, CAN, transceiver, comprising:
   a transmit data, TXD, interface, a receive data, RXD, interface, a CAN Bus interface, a transmitter, a receiver, a reducer, and a test unit,
   wherein a transmitter input of the transmitter is coupled to the TXD interface for receiving a TXD signal,
   wherein a transmitter output of the transmitter is coupled to a test unit input of the test unit and a first test unit output of the test unit is coupled to the CAN Bus interface,
   wherein the CAN Bus interface is coupled to a receiver input of the receiver via the reducer,
   wherein a receiver output of the receiver is coupled to the RXD interface,
   wherein a second test unit output of the test unit is coupled to the receiver input of the receiver,
   wherein the test unit is configured to change from a first state to a second state, and vice versa,
   wherein the test unit is configured, in the first state, to couple the test unit input to the first test unit output and to decouple the test unit input from the second test unit output, and
   wherein the test unit is configured, in the second state, to decouple the test unit input from the first test unit output and to couple the test unit input to the second test unit output.

2. The CAN transceiver of claim 1, wherein the reducer is configured to generate an output voltage for the receiver based on a CAN Bus voltage from the CAN Bus interface, such that the output voltage is less than one tenth, one twentieth, or one thirtieth of the CAN Bus voltage.

3. The CAN transceiver of claim 2, wherein the CAN Bus interface is coupled to a reducer input of the reducer, wherein a reducer output of the reducer is coupled to the receiver input, and wherein the reducer is configured, if a test voltage from the second test unit output is present at the reducer output, to prevent the test voltage at the reducer output to cause an interference voltage at the reducer input, or to convert the test voltage at the reducer output into the interference voltage at the reducer input, such that the interference voltage is less than one tenth, one twentieth, or one thirtieth of the test voltage.

4. The CAN transceiver of claim 1, wherein a first control interface of the test unit is coupled to the transmitter such that the transmitter is controllable by the test unit via the first control interface.

5. The CAN transceiver of claim 4, wherein the test unit is configured to control the transmitter in the second state such that the transmitter generates a sender signal at the transmitter output.

6. The CAN transceiver of claim 5, wherein the first control interface of the test unit is coupled to the transmitter input, and wherein the test unit is configured to generate a digital reference signal and to send the reference signal to the transmitter input of the transmitter via the first control interface, and wherein the transmitter is configured to generate the sender signal at the transmitter output based on the reference signal.

7. The CAN transceiver of claim 3, wherein the test unit comprises an observer interface coupled to the receiver output of the receiver such that the test unit can receive an RXD signal from the receiver.

8. The CAN transceiver of claim 1, wherein a first control interface of the test unit is coupled to the transmitter such that the transmitter is controllable by the test unit via the first control interface, wherein the test unit is configured to control the transmitter in the second state such that the transmitter generates a sender signal at the transmitter output, wherein the first control interface of the test unit is coupled to the transmitter input, and wherein the test unit is configured to generate a digital reference signal and to send the reference signal to the transmitter input of the transmitter via the first control interface, and wherein the transmitter is configured to generate the sender signal at the transmitter output based on the reference signal, and wherein the test unit comprises an observer interface coupled to the receiver output of the receiver such that the test unit can receive an RXD signal from the receiver.

9. The CAN transceiver of claim 8, wherein the test unit is configured, in the second state, to compare a test message represented by the reference signal to at least one receive message represented by the RXD signal, and wherein the test unit is configured to determine whether the CAN transceiver is operating erroneously based on a result of the comparison.

10. The CAN transceiver of claim 9, wherein a second control interface of the test unit is coupled to a third control interface of the CAN transceiver, and wherein the test unit is configured to send a status signal via the second control interface, the status signal representing whether the CAN transceiver is operating erroneous.

11. The CAN transceiver of claim 10, wherein the test unit is coupled to the TXD interface, and wherein the test unit is configured to receive the TXD signal via the TXD interface, and wherein the test unit is configured to detect a transmission idle time in which no TXD signal is received via the TXD interface, and wherein the test unit is configured to prevent a change to the second state outside the transmission idle time.

12. The CAN transceiver of claim 1, wherein the test unit is coupled to the TXD interface, and wherein the test unit is configured to receive the TXD signal via the TXD interface, and wherein the test unit is configured to detect a transmission idle time in which no TXD signal is received via the TXD interface, and wherein the test unit is configured to prevent a change to the second state outside the transmission idle time.

13. The CAN transceiver claim 12, wherein the test unit is configured, when the test unit is in the second state, to change to the first state at the end of the transmission idle time.

14. The CAN transceiver of claim 8, wherein the test unit is configured to detect a Bus idle time in which no CAN Bus signal is received via the CAN Bus interface, and wherein the test unit is configured to prevent a change to the second state outside the Bus idle time.

15. The CAN transceiver of claim 14, wherein the test unit is configured, when the test unit is in the second state, to change to the first state at the end of the Bus idle time.

16. The CAN transceiver of claim 11, wherein the test unit is configured to detect a Bus idle time in which no CAN Bus signal is received via the CAN Bus interface, and wherein the test unit is operable to change to the second state while the transmission idle time and a Bus idle time are present simultaneously.

17. A method for a CAN transceiver comprising a transmit data, TXD, interface, a receiver data, RXD, interface, a CAN Bus interface, a transmitter, a reducer, and a test unit, wherein a transmitter input of the transmitter is coupled to the TXD interface for receiving a TXD signal, wherein a transmitter output of the transmitter is coupled to a test unit input of the test unit, and a first test unit output of the test unit is coupled to the CAN Bus interface, wherein the CAN Bus interface is coupled to a receiver input of the receiver via the reducer, wherein a receiver output of the receiver is coupled to the RXD interface, wherein a second test unit output of the test unit is coupled to the receiver input of the transmitter, wherein the test unit is configured to change from a first state to a second state, the method comprising the following steps:
   a) in the first state, coupling the test unit input to the first test unit output and decoupling the test unit input from the second test unit output,
   b) in the second state, decoupling the test unit input from the first test unit output and coupling the test unit input to the second test unit output.

18. The method of claim 17, wherein the reducer generates an output voltage for the receiver based on a CAN Bus voltage from the CAN Bus interface, such that the output voltage is less than one tenth, one twentieth, or one thirtieth of the CAN Bus voltage.

19. The method of claim 18, wherein the CAN Bus interface is coupled to a reducer input of the reducer, wherein a reducer output of the reducer is coupled to the receiver input, and wherein the reducer, if a test voltage from the second test unit output is present at the reducer output, prevents the test voltage at the reducer output to cause an interference voltage at the reducer input, or converts the test voltage at the reducer output into the interference voltage at the reducer input, such that the interference voltage is less than one tenth, one twentieth, or one thirtieth of the test voltage.

20. The method of claim 17, wherein the test unit controls the transmitter in the second state such that the transmitter generates a sender signal at the transmitter output.

* * * * *